United States Patent [19]
Bäck et al.

[11] Patent Number: 5,481,575
[45] Date of Patent: Jan. 2, 1996

[54] METHOD AND A DEVICE FOR DETECTING CORE OSCILLATIONS IN A NUCLEAR REACTOR

[75] Inventors: Anders Bäck; Stefan Börlin, both of Västerås, Sweden

[73] Assignee: ABB Atom AB, Vasteras, Sweden

[21] Appl. No.: 249,985

[22] Filed: May 27, 1994

[51] Int. Cl.⁶ .................................................. G21C 17/00
[52] U.S. Cl. ...................... 376/254; 376/216; 376/217; 376/255; 376/259
[58] Field of Search .................... 376/254, 216, 376/217, 255, 259; 976/DIG. 301; 375/102

[56] References Cited

U.S. PATENT DOCUMENTS

| | | | |
|---|---|---|---|
| 4,815,108 | 3/1989 | Oda | 375/102 |
| 5,141,710 | 8/1992 | Stirn et al. | 376/254 |
| 5,174,946 | 12/1992 | Watford et al. | 376/216 |
| 5,225,149 | 7/1993 | Banda | 376/255 |

Primary Examiner—Donald P. Walsh
Assistant Examiner—Meena Chelliah
Attorney, Agent, or Firm—Watson, Cole, Grindle & Watson

[57] ABSTRACT

A method and a device for detecting oscillations in the core of a boiling-water nuclear reactor (BWR) comprising a plurality of neutron detectors, wherein instability is detected based on oscillations in the output signals of the neutron detectors. For each one of a number of selected neutron detectors, oscillations in the output signals of the neutron detectors are detected. The oscillations are detected on the basis of an oscillation signal (SS) which indicates that an oscillation criterion is fulfilled. An alarm signal for remaining oscillations Ka is generated if the oscillation signal (SS) remains during one delay interval (T3). A first alarm signal (LR) is generated if the oscillation signal (SS) indicates that the oscillation criterion is fulfilled at least once, during each of a predetermined number of consecutive alarm intervals (T1). An alarm signal for intermittent oscillations (Ra) is generated by blocking the first alarm signal (LR) when the alarm signal for remaining oscillations (Ka) is present. (FIG. 5)

13 Claims, 5 Drawing Sheets

METHOD AND A DEVICE FOR DETECTING CORE OSCILLATIONS IN A NUCLEAR REACTOR

TECHNICAL FIELD

The present invention relates to a method and a device for detecting oscillations in the core of a boiling-water nuclear reactor (BWR) comprising a plurality of neutron detectors, and wherein instability is detected on the basis of oscillations in the output signals of the neutron detectors.

BACKGROUND ART

A core in a nuclear reactor comprises a plurality of fuel assemblies. These are arranged vertically in the core in spaced relationship to each other. A fuel assembly comprises a plurality of vertical fuel rods, each of which contains a stack of pellets of a nuclear fuel, arranged in a cladding tube. The core is surrounded by water which serves both as coolant and as neutron moderator. The reactor core also comprises a plurality of control rods which, by being inserted into and withdrawn from the core, control the reactivity of the core and hence its output power.

Thermohydraulic core instability is a well-known problem which may arise in a boiling-water nuclear reactor which is run with a high power and a low coolant flow. When cooling water is pumped upwards through the reactor core, steam is generated. The steam bubbles are in motion all the time, which produces variations in the water/steam ratio in the core. If these variations in the water flow are not damped in a natural way by friction, they may grow into sustained oscillations, that is, the reactor core has become unstable. Since water is a good moderator whereas steam is a poor moderator, these flow oscillations will also induce oscillations in the neutron flux.

The oscillations may be of varying types and have different appearances and propagation. Certain oscillations start with a low amplitude and slowly grow larger and larger, others may be initiated by a temporary event, for example by a cooling pump stopping, and may then almost immediately assume its maximum amplitude and then continue to oscillate with a constant amplitude. The propagation of the oscillation may vary from global in-phase oscillations to local counter-phase and phase-shifted oscillations when some part of the core oscillates out of phase to the rest of the core. One form of intermittent oscillations have also been detected, that is, oscillations which move around in the core with a certain frequency. Oscillations in the neutron flux and the coolant flow may result in fixed margins for the fuel being exceeded, which in turn may lead to fuel damage. Instability in the reactor core must, therefore, be detected and acted upon.

For measuring the neutron flux in boiling-water nuclear reactors (BWRs), neutron-sensitive detectors, so-called LPRM (Local Power Range Monitor) detectors, are used. A plurality of neutron detector tubes are arranged in spaced relationship to each other in the core, each of these tubes including four LPRM detectors located at four levels separated from each other in the vertical direction. The detectors form a regular lattice in the core.

If the core becomes unstable and the neutron flux starts oscillating, this means that the output signals of the LPRM detectors start oscillating. U.S. Pat. No. 5,174,946 discloses a device and a method for determining whether the core is unstable, starting from the output signals from the LPRM detectors. The method and device described in the US patent specification determine whether instability exists starting from a combination of the output signals from a plurality of detectors. A disadvantage of using a combination of a plurality of output signals is that it may be difficult to detect local oscillations where only few (1–3) detectors oscillate.

If only few detectors oscillate and these detectors are combined with other detectors which do not oscillate, the risk is great that the resultant signal does not oscillate to a sufficient extent to reveal the instability. The method and device described in the US patent specification detect only oscillations whose amplitude is growing, which means that an instability which causes an oscillation with a constant or slightly decreasing amplitude cannot be detected. The described method and device do not comprise any special detection of intermittent oscillations.

SUMMARY OF THE INVENTION

The invention aims to provide a device and a method for detecting oscillations in a reactor core. What characterizes the method and the device according to the invention will become clear from the accompanying claims.

DESCRIPTION OF THE PREFERRED EMBODIMENTS

Figure 1:
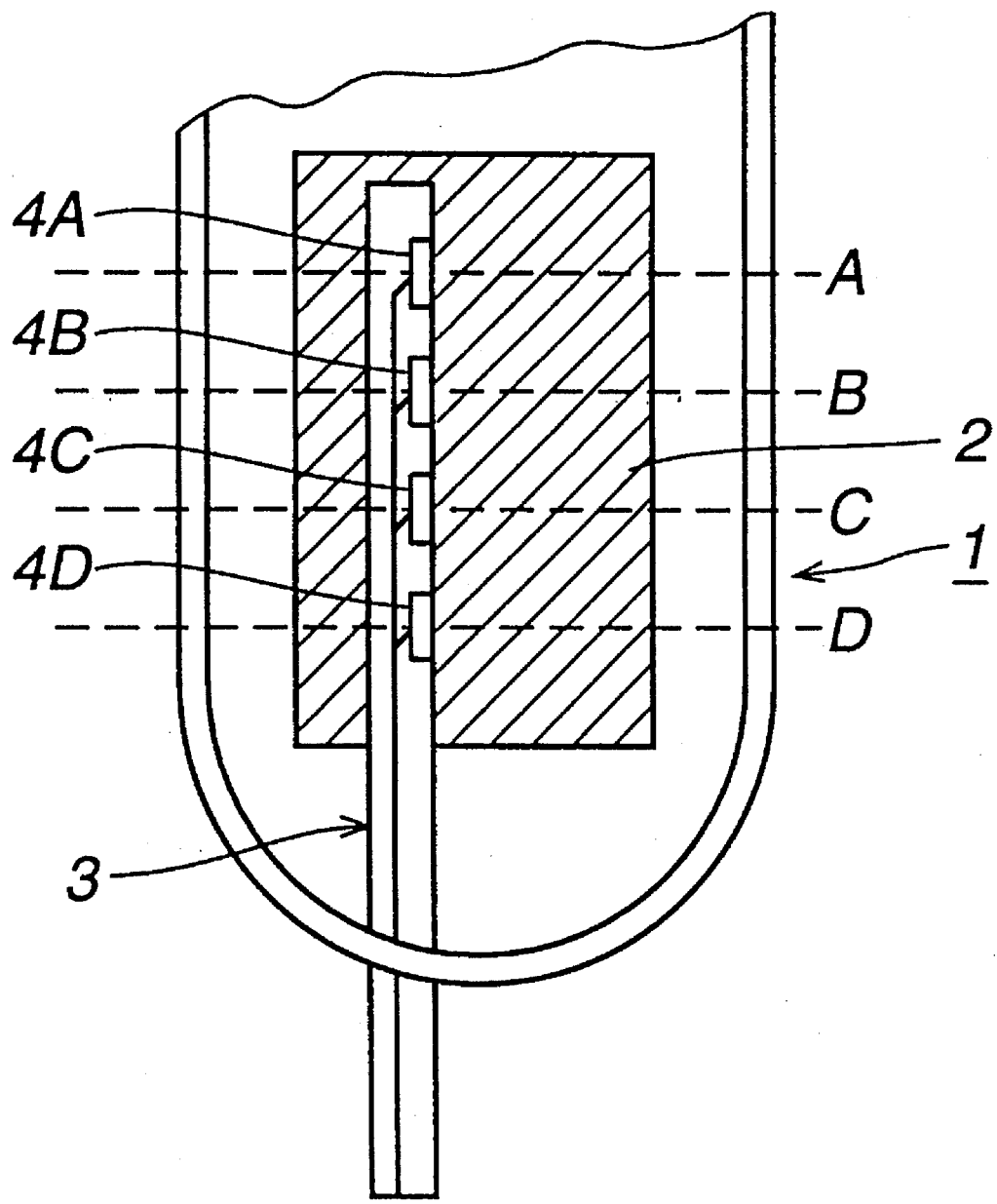
FIG. 1 is a schematic view of a reactor vessel with a neutron detector tube in cross section.

FIG. 1 shows a cross section of a reactor vessel 1 associated with a boiling-water reactor. The reactor core 2 contains fuel in the form of fuel assemblies between and through which cooling water is pumped. A plurality of vertical neutron detector tubes are arranged evenly distributed over the core. The figure shows a cross section of a neutron detector tube 3. The neutron detector tube is hollow and includes four equidistantly distributed, fixedly mounted neutron flux detectors 4A, 4B, 4C, 4D, so-called LPRM detectors. All the LPRM detectors in the core are distributed at four levels, 80%, 60%, 40% and 20% of the height of the core. The levels are designated A, B, C, D in FIG. 1. The core comprises about 80–150 LPRM detectors, depending on the reactor type. The LPKM detectors form a regular lattice in the core.

Figure 2:
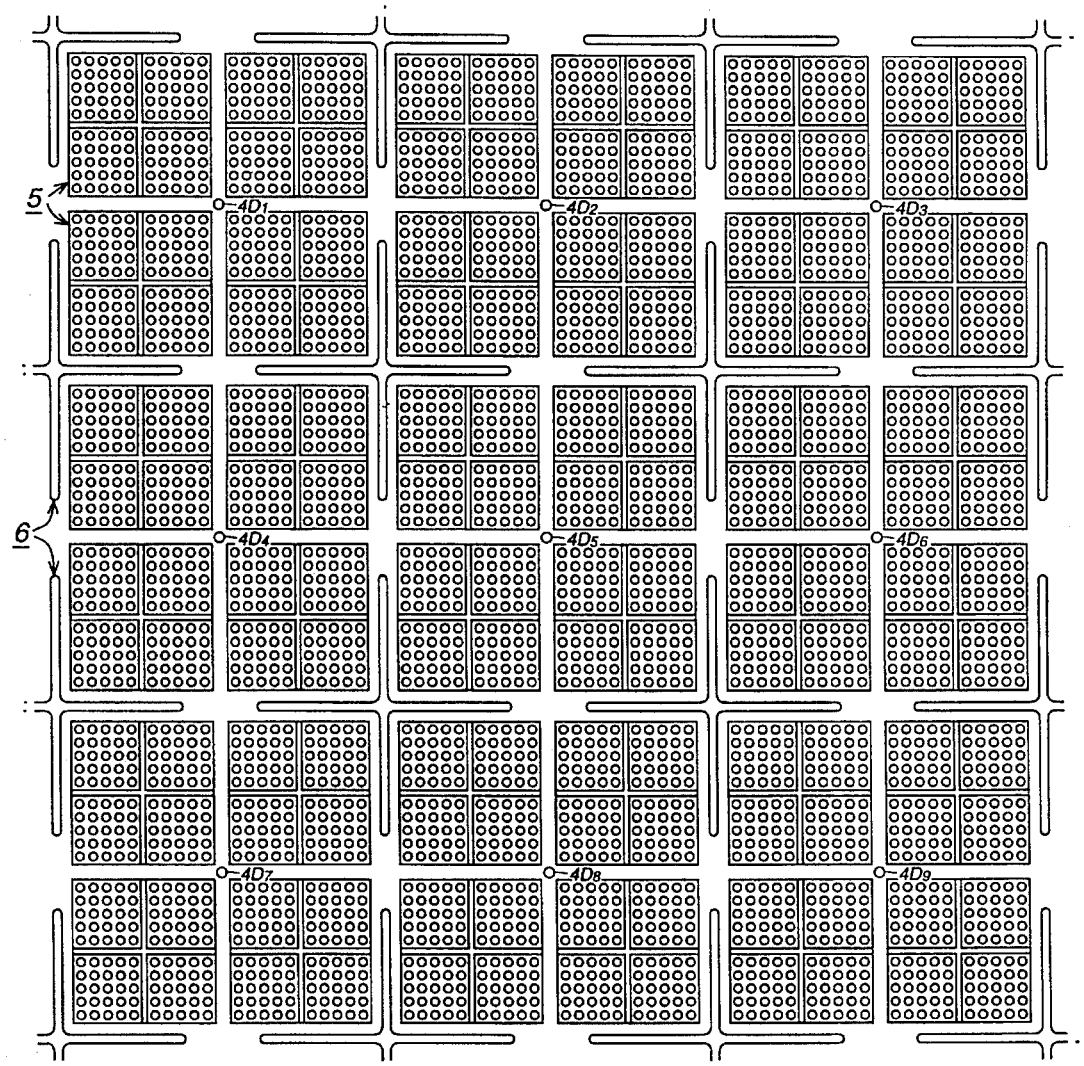
FIG. 2 shows part of the core in FIG. 1 in a horizontal section through level D.

FIG. 2 shows part of the core in FIG. 1 in a horizontal section through level D. Fuel assemblies 5 with a substantially square cross section are arranged vertically in the core at a certain distance from each other. This forms a check pattern of vertically extending gaps between the fuel assemblies. The section includes 36 fuel assemblies. The total number of fuel assemblies in a whole cross section amounts to several hundred. The reactor core comprises a plurality of control rods 6, placed parallel to the fuel assemblies in the vertically extending gaps. In the vertically extending gaps, also LPIM detectors 4D₁–4D₉ are arranged.

Figure 3:
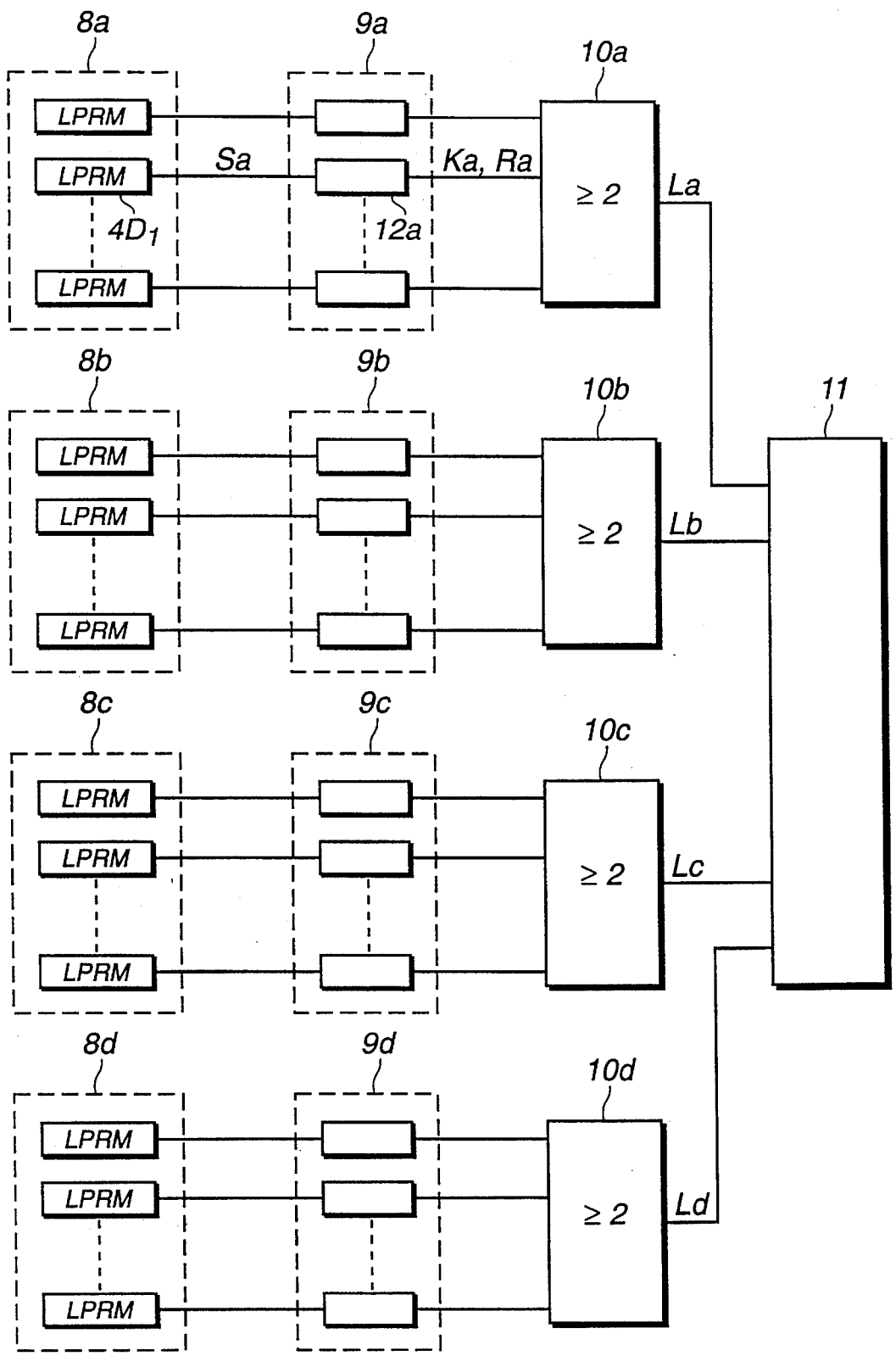
FIG. 3 is a block diagram of an embodiment of a device for detecting instability in the core according to the invention.

FIG. 3 shows in a block diagram one embodiment of a device for detecting instability in the core. In practice, it has proved that core oscillations primarily arise in the lower part of the core. In a preferred embodiment, oscillations are detected only in the LPRM detectors at the two lowermost levels (C, D) in the core. All the detectors at the two lowermost levels are divided into four detector groups 8a, 8b, 8c, 8d. Detectors mounted in the same neutron detector tube belong to the same detector group. The detectors in one detector group are chosen so that as large parts of the core as possible are represented in each group.

Each detector group is associated with a group of oscillation detectors 9a, 9b, 9c, 9d. Each LPRM detector in the detector group is connected to an oscillation detector in the corresponding group of oscillation detectors. The oscillation detector detects oscillations in the output signal from the LPRM detector. An oscillation detector has two output signals (K, R), one triggering alarm for a remaining oscillation (K), and the other triggering alarm for an intermittent oscillation (R). If a detector is, or is suspected to be, defective, the alarm signals from the corresponding oscillation detector are blocked manually. The output signals from one group of oscillation detectors are combined into an alarm unit 10a, 10b, 10c, 10d. The output signals from all the alarm units La, Lb, Lc, Ld are transmitted to a reactor protection system 11 for further processing.

As an example, FIG. 3 shows how the output signal Sa from the LPRM detector 4D₁ is processed. Sa is input signal to the oscillation detector 12a, which detects whether the input signal Sa oscillates, and if it oscillates it is determined whether it is a remaining or an intermittent oscillation. The output signals Ka and Ra from the oscillation detector are forwarded to the alarm unit 10a but can also constitute information to the operator. The alarm unit determines whether the reactor protection system 11 is to be alarmed. Alarm to the reactor protection system is given via the alarm signal LA. In a corresponding way, the output signals from the other LPRM detectors are processed.

The alarm unit alarms the reactor protection system if an optional alarm criterion is fulfilled. A suitable alarm criterion may, for example, be that at least two of the LPRM detectors in the detector group oscillate, whether the detector oscillates because of an intermittent or a remaining core oscillation is of no importance for fulfilling the alarm criterion. The reactor protection system automatically initiates a partial reactor scram or a full scram if an optional reactor scram criterion is fulfilled. A suitable reactor scram criterion is that at least two of the alarm units give alarm. What kind of oscillation (intermittent or remaining) has given rise to an alarm can be conveyed as information to a reactor operator. It may, for example, also be of interest to the reactor operator to see which individual detectors alarm.

Figure 4A:
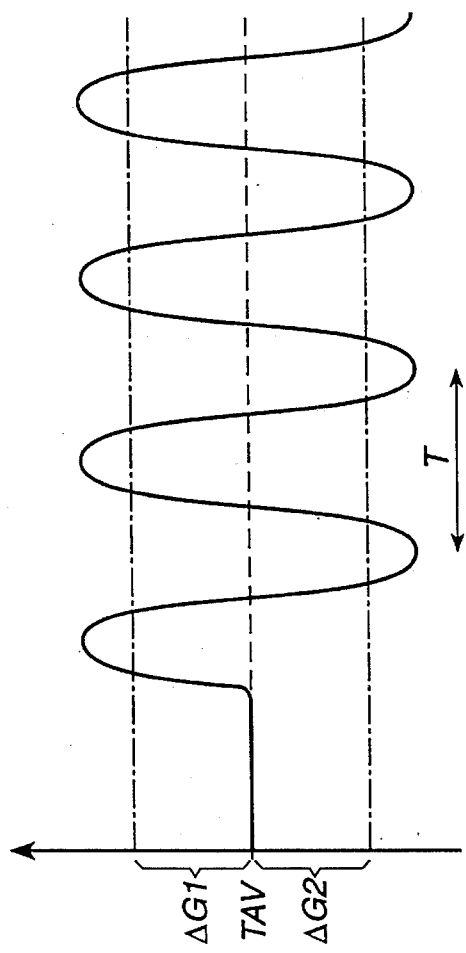
FIG. 4a shows an example of an output signal from a LPRM detector in case of a suddenly initiated and then continuing oscillation.

FIG. 4a shows an example of a remaining oscillation in the output signal from an LPRM detector. TAV is the time-average value of the detector signal. Instability arose suddenly because of a temporary event, for example a cooling pump that stopped. The output signal oscillates around its time-average value with an approximately constant maximum and minimum amplitude. The period of a remaining oscillation is designated T. The frequency of the oscillations in case of an instability varies between different reactors and is normally known for an individual reactor. The frequency of the oscillation is due to the coolant's time of transportation through the fuel channel, that is, the time it takes for a "density wave" to transport through the core. In this example, the reactor oscillates with a frequency of about 0.5 Hz in case of an instability, which means that the period T is about two seconds.

An oscillation has been detected when the output signal from the LPRM detector fulfills one oscillation criterion. The oscillation criterion means that the output signal of the detector during one oscillation interval of a predetermined duration, at least once exceeds an upper limit, which consists of the sum of the time-average value TAV an upper limit value ΔG1 (TAV+G1), and at least once is lower than a lower limit, which consists of the difference between the time-average value TAV and a lower limit value ΔG2 (TAV−ΔG2). A remaining oscillation is an oscillation for which the oscillation criterion is fulfilled for a long period of time.

To fulfill the oscillation criterion, the detector output signal must at least once exceed the upper limit and at least once be below the lower limit. If the output signal only exceeds the upper limit, or if it is only lower than the lower limit, this may be a sign of a power increase or a power decrease, which is now allowed to release an alarm. Short randomly occurring oscillations may sometimes arise without this being a sign of a core instability. This type of oscillation is not allowed to give rise to alarm. An alarm may only be released when the detector signal continuously oscillates around its own average value, or when the oscillations recur at regular intervals, so-called intermittent oscillations.

Figure 4B:
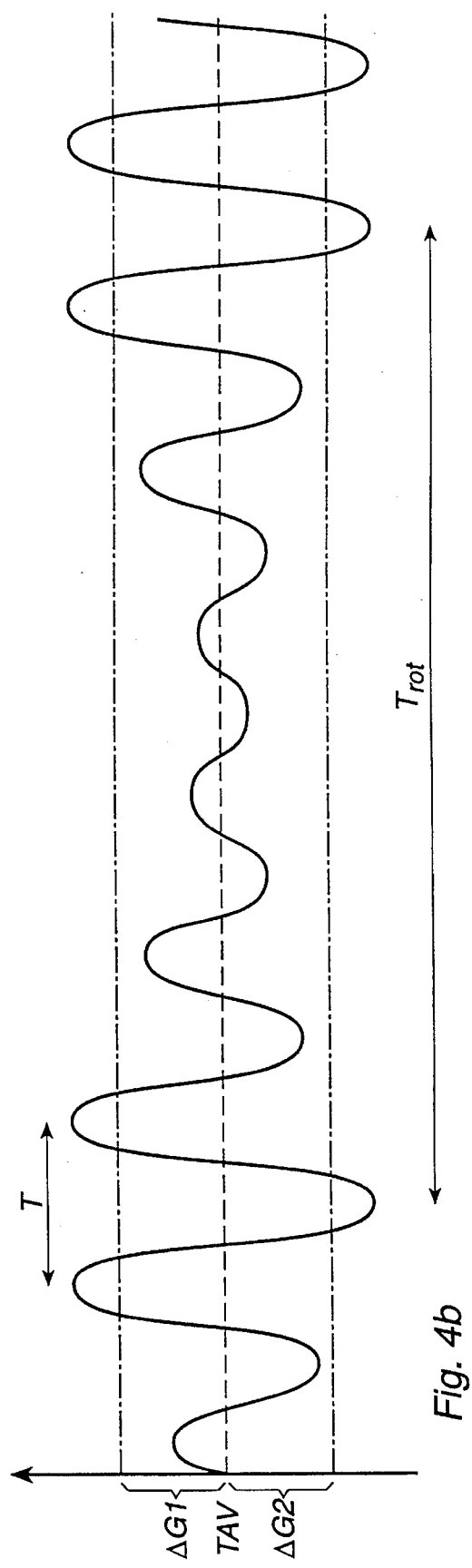
FIG. 4b shows an example of an output signal from an LPRM detector in case of an intermittent oscillation.

FIG. 4b shows an example of the appearance of an intermittent oscillation. The intermittent oscillation consists of a remaining oscillation with the period T, the amplitude of which varies periodically. The period of the intermittent oscillation, that is, the time between two amplitude maximums, is designated Trot and is greater than or equal to the period of the remaining oscillation T. For an intermittent oscillation, the oscillation criterion is only fulfilled during part of the period $T_{rot}$. For the remainder of the period, the oscillations are too small to fulfill the oscillation criterion.

Figure 5:
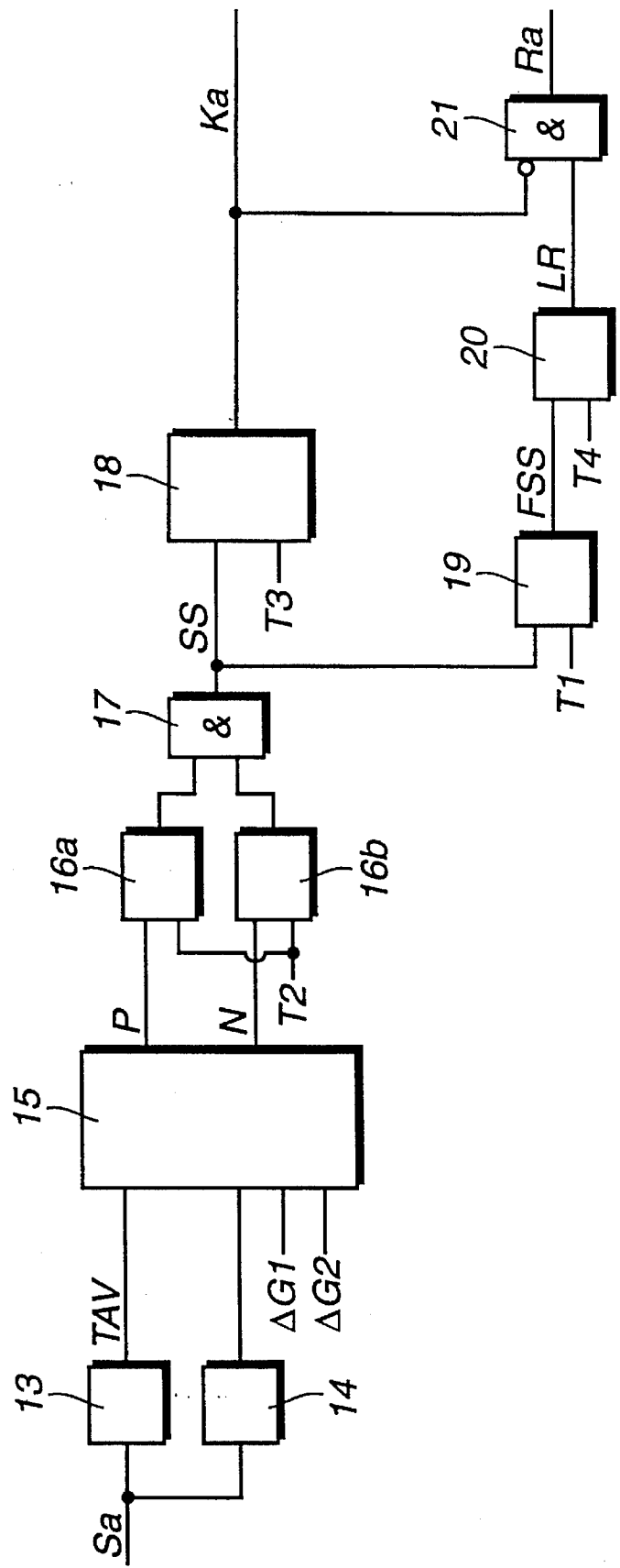
FIG. 5 schematically shows a device for detecting whether an individual LPRM detector oscillates.

FIG. 5 shows in more detail the oscillation detector 12a in FIG. 3. The output signal Sa of the LPRM detector is filtered hard in a filter 13, the output signal TAV of which corresponds to the time-average value of the output signal Sa. To remove unnecessarily high noise signals from the output signal Sa, it is slightly filtered in a filter 14. In a comparison device 15, the noise-reduced signal is compared with its own time-average value TAV. If the noise-reduced signal exceeds the upper limit (TAV+ΔG1), a pulse P is generated on the positive output of the comparison device, and if the noise-reduced signal is lower than the lower limit (TAV−ΔG2), a pulse N is generated on the negative output of the comparison device. These two pulses are each extended in a pulse extender 16a, 16b by an extension time T2 corresponding to the oscillation interval. A pulse extender functions in such a way that if a signal at its input is low, the output of the pulse extender is not reset until after the set extension time. If a new pulse should enter the input before the extension time has expired, the output will not be reset.

The extended pulses are combined in an AND circuit 17. The output signal from the AND circuit, called the oscillation signal SS, indicates that the oscillation criterion is fulfilled. The oscillation signal must not be reset only because the comparison device has failed to observe that the signal exceeded the upper limit, or that the signal was below the lower limit. Therefore, the oscillation interval should cover a good two periods of the oscillation sought. In this example, it is suitable to set the oscillation interval at five seconds, which covers 2.5 periods.

In a delay circuit 18, all brief alarms are filtered away, for example alarms caused by intermittent oscillations. The delay interval T3 constitutes a limit value for the shortest time that an oscillation can proceed to be considered a remaining oscillation. The output signal Ka from the delay circuit 18 is an alarm signal for remaining oscillations Ka. In this example, the delay interval is 30 seconds. The output signal Ka from the delay circuit 18 only releases alarm for remaining oscillations, that is, oscillations which last more than 30 seconds.

An intermittent oscillation may have a frequency $f_{rot}$ in the interval from zero up to the frequency of the remaining oscillation (0 Hz<$f_{rot}$<0.5 Hz). For identification of the intermittent oscillations down to a chosen lowest frequency, the oscillation signal SS, which shows whether the oscillation criterion is fulfilled, is connected to a pulse extender 19 which extends the oscillation signal during an alarm interval T1, corresponding to the period of the lowest frequency chosen. The oscillation signal FSS thus extended remains in case of periodically recurring oscillations with frequencies above the lowest frequency chosen. To be certain that it is a question of a recurring oscillation, the alarm in a delay circuit 20 is delayed for a delay time T4, corresponding to a specified number n of alarm intervals (T4=n * T1). A suitable number of alarm intervals is five, which provides the delay time T4=5 * T1. An alarm is only released if the extended oscillation signal FSS is high during the whole delay time T4.

The alarm signal LR from the delay circuit 20 alarms both for remaining and intermittent oscillations. To block away alarms for remaining oscillations, the alarm signal LR is connected to one of the inputs of an AND circuit 21, and the alarm signal for remaining oscillations Ka is connected to the other input thereof, which is an inverted input. The output signal Ra from the AND circuit 21 is a pure alarm signal for intermittent oscillations. The alarm signals Ka and Ra are transmitted to the alarm unit, provided that the LPRM detector is not defective. If the detector is, or is suspected to be, faulty in any way, the alarm signals Ka and Ra will be blocked.

One advantage of the invention is that also local oscillations can be detected. This is possible because the oscillations are detected directly in the output signal for each individual neutron detector, and not in a combination of output signals from a plurality of detectors.

Another advantage of the invention is that oscillations with a constant amplitude can be detected, since there is no demand for a growing amplitude of the oscillation.

In the foregoing, an embodiment of the invention comprising separate units has been described. The scope of the invention comprises different embodiments, which may consist of more or less integrated, possibly program-controlled embodiments.

In this embodiment, all the LPRM detectors from the two lowermost levels in the core are utilized for detecting an instability, but, of course, an optional number of detectors from all the levels can be utilized.

We claim:

1. A method for detecting oscillations in the core of a boiling water nuclear reactor, comprising the steps of:

detecting instability of the nuclear reactor on the basis of oscillations in the output signals of a plurality of neutron detectors mounted in said nuclear reactor;

generating for each neutron detector of said plurality of neutron detectors an oscillation output signal (SS) if the output signal from said each neutron detector fulfills the criterion that said oscillation output signal (SS) assumes at least one upper extreme value exceeding an upper limit, and at least one lower extreme value lower than a lower limit during an oscillation interval (T2) of a predetermined value; and generating for each neutron detector of said plurality of neutron detectors at least one alarm signal (Ka) for remaining oscillations, if said oscillation signal (SS) remains during a delay interval (T3) of a predetermined duration.

2. A method for detecting oscillations in the core of a boiling water nuclear reactor according to claim 1, wherein in said step of generating an oscillation output signal (SS), said oscillation output signal (SS) exceeds said upper limit if the difference between the time-average value (TAV) of said oscillation output signal (SS) and the upper extreme value thereof is greater than a first predetermined value (G1), and said output signal is lower than said lower limit if the difference between the time-average value (TAV) of said oscillation output signal (SS) and the lower extreme value thereof is greater than a second predetermined value (G2).

3. A method for detecting oscillations in the core of a boiling water nuclear reactor according to claim 1, wherein in said step of generating at least one alarm signal, a second alarm signal (LR) is generated if said oscillation output signal (SS) from a neutron detector fulfills at least one oscillation criterion during each of a predetermined number of consecutive alarm intervals (T1) of a predetermined duration.

4. A method of detecting oscillations in the core of a boiling water nuclear reactor according to claim 2, wherein in said step of generating at least one alarm signal, a second alarm signal (LR) is generated if said oscillation output signal (SS) completes at least one condition of oscillation during each of a predetermined number of consecutive alarm intervals (T1), each of a predetermined duration.

5. A method of detecting oscillations in a boiling water nuclear reactor according to claim 3, wherein said step of generating at least one alarm signal includes the step of generating an alarm signal (Ra) for intermittent oscillations, provided that said second alarm signal (LR) exists and that no alarm signal (Ka) for remaining oscillations exists.

6. A device for detecting oscillations in a boiling water nuclear reactor, comprising:

means for detecting instability of the nuclear reactor on the basis of oscillations in a plurality of neutron detectors mounted in said nuclear reactor;

first means for generating for each neutron detector of said plurality of neutron detectors an oscillation output signal (SS) if the output signal from said each neutron detector fulfills the criterion that said oscillation output signal (SS) assumes at least one upper extreme value exceeding an upper limit, and at least one lower extreme value lower than a lower limit during an oscillation interval (T2) of a predetermined value; and second means for generating for each neutron detector of said plurality of neutron detectors at least one alarm signal (Ka) for remaining oscillations, if said oscillation output signal (SS) remains during a delay interval (T3) of a predetermined duration.

7. A device for detecting oscillations in a boiling water nuclear reactor according to claim 6, wherein said first means for generating includes means for determining the difference between the output signal of a neutron detector and the time average value (TAV) thereof and generating a signal (P) if said difference exceeds an upper limit and a signal (N) if said difference is below a lower limit.

8. A device for detecting oscillations in a boiling water nuclear reactor according to claim 7, further comprising means for filtering said oscillation output signal.

9. A device for detecting oscillations in a boiling water nuclear reactor according to claim 8, wherein said first means for generating further includes means for extending said signal (P) and said signal (N) by a predetermined duration corresponding to an oscillation interval (T2).

10. A device for detecting oscillations in a boiling water nuclear reactor according to claim 9, wherein said first means for generating further includes means for generating an oscillation output signal (SS) with the simultaneous presence of said extended signal (P) and said extended signal (N).

11. A device for detecting oscillations in a boiling water nuclear reactor according to claim 10, wherein said second means for generating includes a first delay member for generating an alarm signal (Ka) for remaining oscillations if said oscillation output signal (SS) remains during a time interval (T3) of a predetermined duration.

12. A device for detecting oscillations in a boiling water nuclear reactor according to claim 10, wherein said first means for generating further includes means for generating an extended oscillation signal (FSS) by extending said oscillation signal (SS) a predetermined duration corresponding to an alarm interval (T1); and a second delay member for generating a second alarm signal (LR) if said extended oscillation signal (FSS) remains during a delay interval (T4) corresponding to a predetermined number of alarm intervals (T1).

13. A device for detecting oscillations in a boiling water nuclear reactor according to claim 11, wherein said first means for generating further includes means for generating an alarm signal (Ra) for intermittent oscillations when said second alarm signal (LR) is present and said alarm signal (Ka) for remaining oscillations is absent.

* * * * *